United States Patent [19]

Lewis

[11] 4,198,306

[45] Apr. 15, 1980

[54] DEPOSIT CONTROL AND DISPERSANT ADDITIVES

[75] Inventor: Robert A. Lewis, Berkeley, Calif.

[73] Assignee: Chevron Research Company, San Francisco, Calif.

[21] Appl. No.: 921,400

[22] Filed: Jul. 3, 1978

[51] Int. Cl.² .................. C10L 1/22; C10M 1/32; C07C 101/18; C07C 101/24

[52] U.S. Cl. .................. 252/51.5 R; 44/63; 44/71; 252/51.5 A; 544/171; 544/399; 546/190; 546/301; 548/347; 560/155; 560/169

[58] Field of Search .......... 252/51.5 A, 51.5 R; 44/58, 63, 71; 560/158, 159, 155, 169; 544/171, 399; 546/190, 301; 548/347

[56] References Cited

U.S. PATENT DOCUMENTS

| 2,679,511 | 5/1954 | De Groote | 560/196 X |
|---|---|---|---|
| 2,679,512 | 5/1954 | De Groote | 560/182 X |
| 2,679,513 | 5/1954 | De Groote | 560/182 X |
| 2,679,514 | 5/1954 | De Groote | 560/182 X |
| 2,679,515 | 5/1954 | De Groote | 560/182 X |
| 2,679,516 | 5/1954 | De Groote | 560/182 X |
| 2,679,519 | 5/1954 | De Groote | 560/182 X |
| 3,359,303 | 12/1967 | Coker et al. | 560/159 |
| 3,454,625 | 7/1969 | Eiseman, Jr. et al. | 560/159 |
| 3,522,620 | 8/1970 | Nozawa et al. | 560/155 X |
| 3,836,471 | 9/1974 | Miller | 252/51.5 A |
| 3,957,854 | 5/1976 | Miller | 252/51.5 A X |
| 3,957,855 | 5/1976 | Miller | 252/51.5 A X |
| 4,035,409 | 7/1977 | Cummings | 560/155 X |
| 4,039,462 | 8/1977 | McCoy | 252/51.5 R X |

*Primary Examiner*—Thomas A. Waltz
*Attorney, Agent, or Firm*—D. A. Newell; S. R. LaPaglia

[57] ABSTRACT

Hydrocarbylpoly(oxyalkylene) aminoesters which are monoesters of a hydrocarbyl-terminated poly(oxyalkylene) alcohol and a monocarboxylic $C_2$–$C_{20}$ (amino-substituted) alkanoic acid find use as fuel and lubricating oil additives.

18 Claims, No Drawings

DEPOSIT CONTROL AND DISPERSANT ADDITIVES

BACKGROUND OF THE INVENTION

1. Field of the Invention

In recent years, numerous fuel detergents or "deposit control" additives have been developed. These materials when added to hydrocarbon fuels employed in internal combustion engines effectively reduce deposit formation which ordinarily occurs in carburetor ports, throttle bodies, venturies, intake ports and intake valves. The reduction of these deposit levels has resulted in increased engine efficiency and a reduction in the level of hydrocarbon and carbon monoxide emissions.

A complicating factor has, however, recently arisen. With the advent of automobile engines that require the use of non-leaded gasolines (to prevent disablement of catalytic converters used to reduce emissions), it has been difficult to provide gasoline of high enough octane to prevent knocking and the concomitant damage which it causes. The difficulty is caused by octane requirement increase, herein called "ORI", which is due to deposits formed in the combustion chamber while the engine is operating on commercial gasoline.

The basis of the ORI problem is as follows: each engine, when new, requires a certain minimum octane fuel in order to operate satisfactorily without pinging and/or knocking. As the engine is operated on any gasoline, this minimum octane increases and, in most cases, if the engine is operated on the same fuel for a prolonged period will reach equilibrium. This is apparently caused by an amount of deposits in the combustion chamber. Equilibrium is typically reached after 5000 to 15,000 miles of automobile operation.

Octane requirement increase measured in particular engines with commercial gasolines will at equilibrium vary from 5 or 6 octane units to as high as 12 or 15 units, depending upon the gasoline compositions, engine design and type of operation. The seriousness of the problem is thus apparent. A typical 1975 or 1976 automobile with a research octane requirement of 85 when new may after a few months of operation require 97 research octane gasoline for proper operation, and little unleaded gasoline of that octane is available. The ORI problem exists in some degree with engines operated on leaded fuels. U.S. Pat. Nos. 3,144,311 and 3,146,203 disclose lead-containing fuel compositions having reduced ORI properties.

It is believed, however, by many experts, that the ORI problem, while present with leaded gasolines, is much more serious with unleaded fuel because of the different nature of the deposits formed with the respective fuels, the size of increase, and because of the lesser availability of high-octane non-leaded fuels. This problem is compounded by the fact that the most common means of enhancing the octane of unleaded gasoline, increasing its aromatic content, also appears to increase the eventual octane requirement of the engine. Furthermore, some of the presently used nitrogen-containing deposit control additives with mineral oil or polymer carriers appear to contribute significantly to the ORI of engines operated on unleaded fuel.

It is, therefore, highly desirable to provide fuel compositions which contain deposit control additives which effectively control deposits in intake systems (carburetor, valves, etc.) of engines operated with fuels containing them, but do not contribute to the combustion chamber deposits which cause increased octane requirements. While, in general, deposit control fuel additives are not believed to be useful dispersants for lubricating oil compositions, certain aminoesters are useful in this regard.

2. Description of the Prior Art

Belgian Pat. No. 855,962, a counterpart of U.S. Patent Application Ser. No. 801,441, discloses poly(oxyalkylene)aminocarbamates as deposit control additives in fuels.

SUMMARY OF THE INVENTION

Hydrocarbylpoly(oxyalkylene) aminoesters which are useful deposit control additives in hydrocarbonaceous fuel compositions and dispersants in lubricating oil compositions, are monoesters of an amino-substituted $C_2$–$C_{20}$ monocarboxylic alkanoic acid and a hydrocarbylpoly(oxyalkylene) alcohol. The aminoesters have molecular weights of about 600–5,000. The amino-substituent contains from 1 to 12 amine nitrogen atoms, up to 40 carbon atoms and has a carbon:nitrogen ratio of up to about 10:1. The poly(oxyalkylene) moiety of the aminoester has a molecular weight from about 500 to about 5,000 and is composed of at least about 5 oxyalkylene units of from 2 to 5 carbon atoms each. At least a sufficient number of the oxyalkylene units are $C_3$–$C_5$ branched-chain oxyalkylene units to render said aminoester soluble in said fuel or lubricating oil composition. The hydrocarbyl group terminating the poly(oxyalkylene) chain contains about 1–30 carbon atoms.

DETAILED DESCRIPTION OF THE INVENTION

The poly(oxyalkylene) monoester of the present invention consists of an amine moiety and a hydrocarbylpoly(oxyalkylene) moiety bonded through an ester linkage, —O—C(O)—R′—, where the oxygen atom is bonded to the poly(oxyalkylene) moiety, and wherein R′ is a $C_1$–$C_{19}$ alkylene radical bonded to a nitrogen atom of said amine moiety. The amine component of the aminoester and the poly(oxyalkylene) component of the aminoester are selected to provide solubility in fuel or lubricating oil compositions, and deposit control activity without octane requirement increase or dispersant activity in lubricating oils. It is neither expected nor necessarily desirable for a single aminoester to be equally effective in all these regards.

Preferred Amine Component

The amine from which the amine component of the aminoester is derived (i.e., the amine from which the aminosubstituent of the $C_2$–$C_{20}$ monocarboxylic acid is derived) may itself be substituted with substituents selected from (A) hydrogen, (B) hydrocarbyl groups of from 1 to about 10 carbon atoms, (C) acyl groups of from 2 to about 10 carbon atoms, and (D) monoketo, monohydroxy, mononitro, monocyano, lower alkyl and lower alkoxy derivatives of (B) and (C). "Lower", as used in terms like lower alkyl or lower alkoxy, means a group containing from 1 to about 6 carbon atoms. Preferably at least one amine nitrogen atom in the amine moiety of the aminoester has a hydrogen atom substituent, i.e., is preferably a primary or secondary amine nitrogen atom.

Hydrocarbyl, as used in describing all the components of this invention, denotes an organic radical composed of carbon and hydrogen which may be aliphatic, alicyclic, aromatic or combinations thereof, e.g., aralkyl. Preferably, the hydrocarbyl group will be relatively free of aliphatic unsaturation, i.e., ethylenic and acetylenic, particularly acetylenic unsaturation. The substituted amines of the present invention are generally, but not necessarily, N-substituted amines.

Exemplary hydrocarbyl groups and substituted-hydrocarbyl groups of the amine precursor include alkyls such as methyl, ethyl, propyl, butyl, isobutyl, pentyl, hexyl, octyl, etc.; alkenyls such as propenyl, isobutenyl, hexenyl, octenyl, etc.; hydroxyalkyls, such as 2-hydroxyethyl, 3-hydroxypropyl, hydroxy-isopropyl, 4-hydroxybutyl, 8-hydroxyoctyl, etc.; ketoalkyls such as 2-ketopropyl, 6-ketooctyl, etc.; alkoxy and lower polyalkoxy alkyls, such as ethoxyethyl, ethoxypropyl, propoxyethyl, propoxypropyl, 2-(2-ethoxyethoxy)ethyl, etc. The preferred substituent groups are hydrogen, $C_1$ to $C_6$ alkyls and $C_1$ to $C_6$ hydroxyalkyls.

In a substituted amine the substituents are found at any atom capable of receiving them. The substituted atoms, e.g., substituted nitrogen atoms, are generally geometrically inequivalent, and consequently the substituted amines finding use in the present invention can be mixtures of mono- and poly-substituted amines with substituent groups situated at equivalent and/or inequivalent atoms.

The amine moiety of the hydrocarbyl-terminated poly(oxyalkylene) aminoester is preferably derived from a polyamine having from 2 to about 12 amine nitrogen atoms and from 2 to about 40 carbon atoms. The amine has a carbon-to-nitrogen ratio of less than 10:1 and preferably from about 1:1 to about 10:1.

The more preferred amine finding use within the scope of the present invention is a polyalkylene polyamine, including alkylene diamine, and including substituted polyamines, e.g., $C_1$-$C_6$ alkyl and hydroxyalkyl-substituted polyalkylene polyamine. Preferably, the alkylene group contains from 2 to 6 carbon atoms, there being preferably from 2 to 3 carbon atoms between the nitrogen atoms. Such alkylene groups are exemplified by ethylene, 1,2-propylene, 2,2-dimethyl-propylene, trimethylene, 1,3,2-hydroxy-propylene, etc. Examples of such polyamines include ethylene diamine, diethylene triamine, di(trimethylene)triamine, dipropylene triamine, triethylene tetraamine, tripropylene tetraamine, tetraethylene pentamine and pentaethylene hexamine. Such amines encompass isomers such as branched-chain polyamines and the previously mentioned substituted polyamines, including hydroxy- and hydrocarbyl-substituted polyamines. Among the polyalkylene polyamines, those containing 2–12 amine nitrogen atoms and 2–24 carbon atoms are especially preferred, and the $C_2$-$C_3$ alkylene polyamines are most preferred, in particular, the lower polyalkylene polyamines, for example, ethylene diamine, dipropylene triamine, etc., i.e., those containing 2–6 carbon atoms and 2–4 nitrogen atoms.

The amine component of the poly(oxyalkylene) aminoester also may be derived from heterocyclic amines, heterocycle substituted amines and substituted heterocyclic compounds, wherein the heterocycle comprises one or more 5-6 membered rings containing oxygen and/or nitrogen. Such heterocycles may be saturated or unsaturated and substituted with groups selected from the aforementioned (A), (B), (C) and (D). The heterocycles are exemplified by piperazines, such as 2-methylpiperazine, N-(2-hydroxyethyl)piperazine, 1,2-bis-(N-piperazinyl)ethane and N,N'-bis(N-piperazinyl)piperazine, 2-methylimidazoline, 3-aminopiperidine, 2-aminopyridine, N-(3-aminopropyl)-morpholine, etc. Among the heterocyclic compounds, the piperazines are preferred.

Typical amines that can be used to form the compounds of this invention include the following: ammonia, methylamine, 2-aminohexane, ethylene diamine, 1,2-propylene diamine, 1,3-propylene diamine, diethylene triamine, triethylene tetramine, tetraethyl pentamine, dimethylaminopropylene diamine, N-(beta-aminoethyl)piperazine, N-(beta-aminoethyl)piperidine, 3-amino-N-ethylpiperidine, N-(beta-aminoethyl)morpholine, N,N'-di(beta-aminoethyl)piperazine, N,N'-di(-beta-aminoethyl)imidazolidone-2, N-(beta-cyanoethyl)ethane-1,2-diamine, 1-amino-3,6,9-triazaoctadecane, 1-amino-3,6-diaza-9-oxadecane, 2-aminoethanol, N-(beta-aminoethyl)diethanolamine, N'-acetyl-N-methyl-N-(beta-aminoethyl)ethane-1,2-diamine, N-(beta-nitroethyl)-1,3-propane diamine, 1,3-dimethyl-5-(beta-aminoethyl)hexahydrotriazine, N-(beta-aminoethyl)-hexahydrotriazine, 5-(beta-aminoethyl)-1,3,5-dioxazine, 2-(2-aminoethylamino)-ethanol, 2-[2-(2-aminoethylamino)ethylamino]-ethanol.

In many instances the amine used as a reactant in the production of the aminoester of the present invention is not a single compound but a mixture in which one or several compounds predominate with the average composition indicated. For example, tetraethylene pentamine prepared by the polymerization of aziridine or the reaction of dichloroethylene and ammonia will have both lower and higher amine members, e.g., triethylene tetramine, substituted piperazines and pentaethylene hexamine, but the composition will be mainly tetraethylene pentamine and the empirical formula of the total amine composition will closely approximate that of tetraethylene pentamine. Finally, in preparing the compounds of this invention, where the various nitrogen atoms of the polyamine are not geometrically equivalent, several substitutional isomers are possible and are encompassed within the final product. Methods of preparation of amine, acid and ester, and their reactions are detailed in Sidgewick's "The Organic Chemistry of Nitrogen," Clarendon Press, Oxford, 1966; Noller's "Chemistry of Organic Compounds," Saunders, Philadelphia, 2nd Ed., 1957; and Kirk-Othmer's "Encyclopedia of Chemical Technology," 2nd Ed., especially Volume 2, pp. 99–116.

Preferred Poly(oxyalkylene) Component

The hydrocarbyl-terminated poly(oxyalkylene) polymers which are utilized in preparing the aminoesters of the present invention are monohydroxy compounds, i.e., alcohols, often termed monohydroxy polyethers, or polyalkylene glycol monohydrocarbylethers, or "capped" poly(oxyalkylene) glycols and are to be distinguished from the poly(oxyalkylene) glycols (diols), or polyols, which are not hydrocarbyl-terminated, i.e., not capped. The hydrocarbyl-terminated poly(oxyalkylene) alcohols are produced by the addition of lower alkylene oxides, such as oxirane, ethylene oxide, propylene oxide, the butylene oxides, or the pentylene oxides to a hydroxy compound R"OH under polymerization conditions. Methods of production and properties of these polymers are disclosed in U.S. Pat. Nos. 2,841,479 and 2,782,240, and the aforementioned Kirk-Othmer's "Encyclopedia of Chemical Technology," Volume 19, p. 507. In the polymerization reaction a single type of alkylene oxide may be employed, e.g., propylene oxide, in which case the product is a homopolymer, e.g., a propylpoly(oxypropylene) alcohol. However, copolymers are equally satisfactory and random copolymers are readily prepared by contacting the hydroxyl-containing compound with a mixture of alkylene oxides, such as a mixture of propylene and butylene oxides. Block copolymers of oxyalkylene units also provide satisfactory poly(oxyalkylene) polymers for the practice of the present invention. Random polymers are more easily prepared when the reactivities of the oxides are relatively equal. In certain cases, when ethylene oxide is copolymerized with other oxides, the higher reaction rate of ethylene oxide makes the preparation of random copolymers difficult. In either case, block copolymers can be prepared. Block copolymers are prepared by contacting the hydroxyl-containing compound with first one alkylene oxide, then the others in any order, or repetitively, under polymerization conditions. A particular block copolymer is represented by a polymer prepared by polymerizing propylene oxide on a suitable monohydroxy compound to form a poly(oxypropylene) alcohol and then polymerizing butylene oxide on the poly(oxypropylene) alcohol.

In general, the poly(oxyalkylene) polymers are mixtures of compounds that differ in polymer chain length. However, their properties closely approximate those of the polymer represented by the average composition and molecular weight.

The hydrocarbylpoly(oxyalkylene) moiety, i.e., the polyether moiety, of the aminoester consists of a hydrocarbylpoly(oxyalkylene) polymer composed of oxyalkylene units, each containing from 2 to 5 carbon atoms. The polymer is bound to the aminoester via the ester linkage at the hydroxy-terminus of the poly(oxyalkylene) chain.

The hydrocarbyl group contains from 1 to about 30 carbon atoms. Preferably the oxyalkylene units contain from 3 to 4 carbon atoms and the molecular weight of the hydrocarbylpoly(oxyalkylene) moiety is from about 500 to about 5,000, more preferably from about 1,000 to about 2,500. Each poly(oxyalkylene) polymer contains at least about 5 oxyalkylene units, preferably 8 to about 100 oxyalkylene units, more preferably about 10–100 units and most preferably 10 to about 25 such units. In general, the oxyalkylene units may be branched or unbranched. Preferably the poly(oxyalkylene) polymer chain contains at least some $C_3$–$C_5$ oxyalkylene units, more preferably branched $C_3$–$C_5$ oxyalkylene are present in at least sufficient number to render the hydrocarbyl-terminated poly(oxyalkylene) aminoester soluble in the fuel composition or the lubricating oil composition of the present invention. This solubility condition is satisfied if the aminoester is soluble in hydrocarbons boiling in the gasoline range, at least to the extent of about 30–20,000 ppm by weight or soluble in an oil of lubricating viscosity to the extent of about 0.01–5 weight percent. A poly(oxyalkylene) polymer chain composed of branched three and/or four carbon oxyalkylene units in at least sufficient amount to effect solubility in the fuel or lube composition is most preferred. The structures of the $C_3$–$C_5$ oxyalkylene units are any of the isomeric structures well known to the organic chemist, e.g., n-propylene, —$CH_2CH_2CH_2$—; isopropylene, —$C(CH_3)CH_2$—; n-butylene, —$CH_2CH_2CH_2CH_2$—; sec.-butylene, —$CH(CH_2CH_3)CH_2$—; tert.-butylene, —$C(CH_3)_2CH_2$—; disec.-butylene, —$CH(CH_3)CH(CH_3)$—; isobutylene, —$CH_2CH(CH_3)CH_2$—; etc. The preferred poly(oxyalkylene) compounds are composed, at least in part, of the branched oxyalkylene isomers, particularly oxy(isopropylene), and oxy(sec.-butylene) units which are obtained from 1,2-propylene oxide and from 1,2-butylene oxide, respectively.

The hydrocarbyl moiety (R''-) which terminates the poly(oxyalkylene) chain contains from 1 to about 30 carbon atoms, and is generally derived from the monohydroxy compound (R''OH) which is the initial site of the alkylene oxide addition in the polymerization reaction. Such monohydroxy compounds are preferably aliphatic or aromatic alcohols of from 1 to about 30 carbon atoms, more preferably an alcohol or an alkylphenol, and most preferably an alkylphenol wherein the alkyl is a straight or branched chain of from 1 to about 24 carbon atoms. One such preferred alkyl group is obtained by polymerizing propylene to an average of 4 units and has the common name of propylene tetramer. The preferred material may be termed either an alkylphenylpoly(oxyalkylene) alcohol or a polyalkoxylated alkylphenol of from 7 to 30 carbon atoms.

Preferred Acid Component

The polyether aminoester of the present invention is the monoester of a hydrocarbylpoly(oxyalkylene) alcohol and an amino-substituted $C_2$–$C_{20}$ monocarboxylic alkanoic acid. The acid moiety which may be represented as —R'COOH, wherein R' is a $C_1$–$C_{19}$ alkylene radical bonded to a nitrogen atom of said amino substituent, is derived from the corresponding acid HR'COOH. Such acids encompass the normal, branched chain and cyclic acids of the monocarboxylic alkanoic acid family, e.g., acetic, propionic, butyric, valeric, hexanoic, heptanoic, octanoic, undecanoic, lauric, myristic, stearic, eicosanic, cyclohexanedecanoic acid, etc. The monocarboxylic acid may be substituted (i.e., R' may be substituted) with any of the aforementioned (A), (B), (C) and (D) substituents which do not adversely affect the method of preparation or the activity of the aminoester of the present invention. Such substituents are preferably hydrogen, $C_1$–$C_{10}$ hydrocarbyl, and monohydroxy-substituted $C_1$–$C_{10}$ hydrocarbyl groups, more preferably lower alkyl, lower alkoxy and lower hydroxyalkyl groups. Preferably the monocarboxylic acid is a $C_2$–$C_{10}$ alkanoic acid, and more preferably is selected from propionic, butyric, pentanoic acids and such substituted acids.

A preferred class of hydrocarbylpoly(oxyalkylene) aminoesters of this invention may be represented by R''O$-$(RO$)_n$C(O)$-$R'$-$R''', wherein —C(O)—R'— is the just-described monocarboxylic acid moiety, R''O$-$(RO$)_n$ is the previously described hydrocarbylpoly(oxyalkylene) moiety (R''O$-$(RO$)_n$H being the hydrocarbylpoly(oxyalkylene) alcohol) and R''' is the previously described amino-substituent bonded to R' at a nitrogen atom of R'''. Preferably, R' is said $C_1$–$C_{19}$ alkylene or substituted alkylene radical; (R''O$-$(RO$)_n$is said hydrocarbyl-terminated polyether chain composed of at least 5 of said $C_2$–$C_5$ oxyalkylene units, RO, capped by a $C_1$–$C_{30}$ hydrocarbyl group, R'', and having a molecular weight of about 500–5,000, i.e., n is an integer greater than 5; and R''' is said amino moiety containing about 1–12 amine nitrogen atoms, preferably 2–12 amine nitrogen atoms, up to 40 carbon atoms, and preferably 2–40 carbon atoms, with a carbon:nitrogen ratio of up to 10:1 and preferably from about 1:1 to 10:1. Preferably, R''' is derived from a polyalkylene polyamine, e.g., lower polyalkylene polyamine such as ethylene diamine, or dipropylenetriamine. Preferably, R"O—(RO)$_n$— is a polymer of 8-100 oxyalkylene units selected from C$_3$-C$_4$ oxyalkylene units, terminated with an alkyl or alkylphenyl group such as a butyl or propylene tetramer-substituted phenyl group, i.e., dodecylphenyl.

Preparation of the Polyether Aminoester

The polyether aminoesters of this invention may be prepared by the esterification of a mono unsaturated monocarboxylic C$_2$-C$_{20}$ acid (i.e., the alkenoic acid corresponding to the aforementioned alkanoic acid), acid halide, acid anhydride, or acid ester, with the hydrocarbylpoly(oxyalkylene) alcohol to produce an unsaturated ester. The unsaturated ester (alkenoate) is then reacted with the aforementioned amine to produce the aminoester of this invention. Such alkenoic acids are exemplified by acrylic acid, methacrylic acid, crotonic acid, isocrotonic acid, 2-butenoic acid, angelic acid, tiglic acid, 3-methyl crotonic acid, 3-hexenoic acid, 2-tetradecenoic acid, etc., the preferred alkenoic acid is acrylic acid, and in general, alpha-beta-unsaturated acids are preferred. As is known to those of skill in the art, the esterification reaction can be carried out by several means, including the reaction of the acyl halide of the aforementioned alkenoic acid with the polyether alcohol, reaction with the carboxylic acid anhydride, etc.

In another route to the aminoester of the present invention, the esterification reaction is carried out between the hydrocarbylpoly(oxyalkylene) alcohol and a C$_2$-C$_{20}$ monocarboxylic alkanoic acid, acid halide, anhydride, or ester, containing an alpha, or beta, or gamma, or etc. halogen, or hydrocarbylsulfonyl substituent, e.g., —OSO$_2$CH$_3$, —OSO$_2$C$_6$H$_5$CH$_3$, etc. The product, a halogen or sulfonyl-substituted carboxylate is then reacted with the aforementioned amine to produce the aminoester of the present invention. Examples of suitable substituted alkanoic acids include chloro or bromopropionic acids, omega-chlorovaleric acid, etc.

When employing an acid (as opposed to an acid halide, anhydride, etc.) the esterification reactions may be carried out on a substantially equimolar basis, although excess acid may be used to improve the rate of reaction. Usually from about 0.5 to 3, preferably 1.2 to 2.0 mols of acid per mol of monool will be used. The cases where less than one mol of acid is used will usually be those where unreacted poly(oxyalkylene) monool is carried along to be used as a supplemental additive in fuel and lubricating oil compositions. The reaction will usually be complete within 2 to 10 hours. Times of reaction will usually be in the range of from 3 to 6 hours. A solvent may be used in the esterification reaction. Suitable solvents include benzene, toluene, xylene, hexanes, etc. The temperature of the reaction will usually be controlled by the boiling point of the solvent since water is usually removed under reflux. A catalyst is preferably used in the esterification reaction. Any suitable acid esterification catalyst may be used. Included are mineral acids such as sulfuric, nitric, hydrochloric, etc. Also suitable are the strong organic acids such as phenyl sulfonic, p-toluene sulfonic acid, etc. When acrylic or substituted acrylic acid is used, it is necessary to employ an inhibitor such as hydroquinone to prevent or minimize polymerization of the unsaturated sites.

Esters may also be formed by reaction of the polyether alcohol with an acid halide (i.e., Example 7), anhydride, or other acid derivative. In the case of the acid halide, one equivalent is preferred, and acid scavengers such as pyridine, triethylamine, sodium carbonate, molecular sieves, etc., may be employed. Inert solvents such as ethylether, aromatic solvents like toluene, xylenes, etc., or aliphatic solvents like hexane, isooctane, etc., may be used. Hydrochloride salts, when formed, may be removed by filtration. Reaction times are typically $\frac{1}{4}$-4 hours.

The amination reaction or reactions may be conducted with or without the presence of a reaction solvent. A reaction solvent is generally employed whenever necessary to reduce the viscosity of the reactant mixture. These solvents should be stable and inert to the reactants and reaction product. Preferred solvents include aliphatic or aromatic hydrocarbons. Depending on the temperature of the reaction, the particular ester used, the mol ratios and the particular amine, as well as the reactant concentrations, the reaction time may vary from less than 1 minute to 4 hours. After the reaction has been carried out for a sufficient length of time, the reaction mixture may be further diluted with hydrocarbon or hydrocarbon-alcohol media and extracted with water (preferably warm water to prevent emulsification), to free the product from any low-molecular-weight amine salts which have formed and any unreacted amines. The product may then be isolated by evaporation of the solvent. If a halo-substituted ester is reacted with amine to produce the aminoester, reaction times may be longer and a small amount of halogen may be present as the salt of the polyether aminoesters. Depending on the particular application of the composition of this invention, the reaction may be carried out in the medium in which it will ultimately find use, e.g. polyether carriers or an oleophilic organic solvent or mixtures thereof and be formed at concentrations which provide a concentrate of a detergent composition. Thus, the final mixture may be in a form to be used directly for blending in fuel or lubricating oil compositions.

In the case of unsaturated esters, the amination reaction is usually carried out with an excess of amine in order to minimize poly-substitution. From about 1 to 10, preferably from about 2 to 5 mols of amine per mol of ester may be used. The reaction may be carried out at temperatures from $-10°$ C. to $150°$ C., preferably in the range of $25°$ C. to $125°$ C.

Compositions

The poly(oxyalkylene) aminoesters will generally be employed in a hydrocarbon distillate fuel. Hydrocarbon distillate fuels are hydrocarbonaceous liquid fuels boiling in the gasoline and diesel oil ranges, i.e., generally having an ASTM D-86, 90% boiling point below about 700° F. and above about 200° F., and include fuels boiling in the range of from about 100° F. to about 750° F. The proper concentration of additive necessary in order to achieve the desired detergency and dispersancy varies depending upon the type of fuel employed, the presence of other detergents, dispersants and other additives, etc. Generally, however, from 30 to 2000 weight parts per million, preferably from 100 to 500 ppm of poly(oxyalkylene) aminoester per part of base fuel is needed to achieve the best results. When other detergents are present, a lesser amount of poly(oxyalkylene) aminoester may be used. For performance as a carburetor detergent only, lower concentrations, for example 30 to 70 parts per million may be preferred.

The deposit control additive may be formulated as a concentrate, using an inert stable oleophilic organic solvent boiling in the range of about 150° to 400° F. Preferably, an aliphatic or an aromatic hydrocarbon solvent is used, such as benzene, toluene, xylene or higher-boiling aromatics or aromatic thinners. Aliphatic alcohols of about 3 to 8 carbon atoms, such as isopropanol, isobutylcarbinol, n-butanol and the like, in combination with hydrocarbon solvents are also suitable for use with the detergent-dispersant additive. In the concentrate, the amount of the additive will be ordinarily at least 10 percent by weight and generally not exceed 70 percent by weight and preferably from 10 to 25 weight percent.

In gasoline fuels, other fuel additives may also be included such as antiknock agents, e.g., methylcyclopentadienyl manganese tricarbonyl, tetramethyl or tetraethyl lead, or other dispersants or detergents such as various substituted succinimides, amines, etc. Also included may be lead scavengers such as alkyl halides, e.g., ethylene dibromide. Additionally, antioxidants, metal deactivators and demulsifiers may be present.

A particularly useful additive is a fuel-soluble carrier oil. Exemplary carrier oils include nonvolatile poly(oxyalkylene) alcohols, glycols (diols) and polyols; other synthetic lubricants or lubricating mineral oil. Particularly preferred carrier oils are $C_2$–$C_5$ poly(oxyalkylene) alcohols, glycol and polyols, such as the Pluronics marketed by BASF Wyandotte Corp., and the UCON LB-series fluids marketed by Union Carbide Corp. When used, these oils are believed to act as a carrier for the detergent and assist in removing and retarding deposits. They are employed in amounts from about 0.005 to 0.5 percent by volume, based on the final gasoline composition. Preferably 100–5,000 ppm by weight of a fuel soluble poly(oxyalkylene) alcohol, glycol or polyol is used as carrier oil. In the previously described concentrate the poly(oxyalkylene) polyols are usually present in amounts of from 5 to 80 percent by weight.

The additives find additional use as dispersant additives in lubricating oils. Suitable oils are any commonly employed oils including paraffinic, naphthenic, halo-substituted hydrocarbons, synthetic esters or combinations thereof. Oils of lubricating viscosity have viscosities in the range of 35 to 50,000 SUS at 100° F., and more usually from about 50 to 10,000 SUS at 100° F. The amount of the poly(oxyalkylene) aminoester of this invention which is incorporated into the lubricating oil to provide the effective amount necessary for dispersancy varies widely with the particular aminoester used as well as the use intended for the lubricating oil composition. Other conventional additives which can be used in combination with the amino esters, include ashless dispersants such as the type disclosed in U.S. Pat. Nos. 3,172,892, 3,219,666, 3,381,022; neutral and basic calcium, barium and magnesium petrosulfonates or alkyl phenates; oxidation inhibitors, antifoam agents, viscosity index improvers, pour-point depressants, and the like, such as chlorinated wax, benzyl-disulfide, sulfurized sperm oil, sulfurized terpene; phosphorus esters such as trihydrocarbon phosphites and phosphates; metal thiocarbamates such as zinc dioctyldithiocarbamate; metal phosphorus dithioates such as zinc dioctylphosphorodithioate; polyisobutene having an average molecular weight of 100,000; etc. In general, the lubricating oil compositions will contain from about 0.01 to about 10 or 20% weight of said oil-soluble aminoester. More usually, the lubricating oil composition of the invention will contain from about 0.5 to about 10% weight, and most usually from about 1 to about 8% of the aminoester.

EXEMPLIFICATION

The following examples are presented to illustrate specific embodiments of the practice of this invention and should not be interpreted as limitations upon the scope of the invention.

EXAMPLE 1

Preparation of Butylpoly(oxypropylene) acrylate 500 g (0.27 mol) of a polypropylene glycol monobutyl ether, i.e., butylpoly(oxypropylene) alcohol, having a molecular weight of about 1850 was combined with 350 ml of xylene, 31 g (0.43 mol) of acrylic acid, 10 g of p-toluene sulfonic acid and 1.0 g of hydroquinone in a 2-liter, 3-neck flask equipped with thermometer, stirrer, heater and a Dean-Stark trap. 5 ml of water was removed over about 4 hours. The reaction temperature reached 143° C. The mixture was cooled, filtered through diatomaceous earth and the solvent was partially removed on a rotary evaporator. The infrared spectrum of the product revealed a strong carbonyl absorption at 1730 cm$^{-1}$ and weak olefin bands at 1630 and 810 cm$^{-1}$.

EXAMPLE 2

Preparation of Butylpoly(oxyalkylene) N-(2-aminoethyl)-2-aminopropionate 15.7 g (0.26 mol) of ethylene diamine was combined with 100 g of the acrylate from Example 1 and 100 ml of xylene, and the mixture was heated for 4 hours at 120° C. After cooling, the mixture was diluted with 300 ml of n-butanol and washed 10 times with 100 ml portions of warm water. The solvents were removed under reduced pressure yielding 88 g of a brown oil. The product showed by infrared a carbonyl band at 1740 cm$^{-1}$ and no olefin absorption. The basic nitrogen content of the product was 0.49% by weight. This product is designated Compound A.

EXAMPLE 3

Preparation of Poly(oxypropylene) aminoesters

Using the apparatus and procedures of Examples 1 and 2, poly(oxyalkylene) aminoesters were prepared employing the acrylate precursor (product of Example 1), and diethylene triamine (to form Compound B) and dimethylaminopropylamine (to form Compound C).

EXAMPLE 4

Preparation of Alkylphenylpoly(oxybutylene) aminopropionate

Employing the apparatus and procedures of Examples 1 and 2, poly(oxyalkylene) aminoesters were prepared employing as the polyether alcohol, dodecylphenylpoly(oxybutylene) alcohol (molecular weight about 1500), acrylic acid, and as polyamines, ethylene diamine (forming Compound D) and dimethylaminopropylamine (forming Compound E).

EXAMPLE 5

Preparation of Butylpoly(oxypropylene) chloroacetate

A 500 g (0.27 mol) portion of the polyether alcohol used in Example 1 was combined in the apparatus used in that example with 250 ml of toluene. The mixture was heated to reflux to remove trace water from the polymer. 1.0 g of p-toluene sulfonic acid and 22.5 g (0.27 mol) of chloroacetic acid were added, and the mixture was heated to reflux to remove water of reaction. After four hours, the mixture was cooled and filtered through diatomaceous earth. A small sample was freed of toluene on a steam plate under a nitrogen stream. The sample showed IR ester absorptions at 1740 and 1765 cm$^{-1}$.

EXAMPLE 6

Preparation of Butylpoly(oxypropylene) N-(3-dimethylaminopropyl)aminoacetate

One half of the chloroacetate from Example 5 (250 g) was added to 41.3 g (0.41 mol) of dimethylaminopropylamine and stirred for 17 hours at 24° C. The mixture was diluted with an equal value of n-butanol and washed repeatedly with warm water. The solvent was removed under reduced pressure. The product (Compound F) was found to contain 0.27 weight percent nitrogen and 0.26% by weight basic nitrogen by ASTM D-2896 and a weak ester absorption at 1740 cm$^{-1}$ by IR analysis.

EXAMPLE 7

Preparation of Dodecylphenylpoly(oxybutylene) chlorovalerate 200 g (0.133 mol) of dodecylphenylpoly(oxybutylene) alcohol (MW 1500) prepared by polymerizing 1,2-epoxybutane onto a branched $C_{12}$ alkylphenol (propylene tetramer phenol) was combined with 200 ml of toluene and 16.2 (0.16 mol) of triethylamine in a flask equipped as in Example 1. The solution was stirred, and 20.3 g (0.133 mol) of 5-chlorovaleroyl chloride was added dropwise. Immediate formation of the triethylamine hydrochloride resulted. The mixture was stirred an additional 1.5 hours, diluted with toluene and filtered. The solvent was removed under reduced pressure. The resulting chloroester exhibited an ester absorption in the infrared at 1740 cm$^{-1}$.

EXAMPLE 8

Preparation of Dodecylphenylpoly(oxybutylene) 5-(2-aminoethylamino)valerate 100 g (0.06 mol) of the product of Example 7 was combined with 200 ml of acetone and 4.23 g (0.03 mol) of sodium iodide in a 500 ml, 3-neck flask equipped as in Example 1. An 18 g portion (0.30 mol) of ethylene diamine was added with stirring, and the mixture was heated to reflux for 6 hours. The mixture was cooled, combined with an equal volume of n-butanol and washed 6 times with 200 ml portions of 50° C. water. The product (Compound G) contained 0.40 weight percent nitrogen (ASTM D-2896) and 0.86% residual chlorine. IR analysis showed strong absorptions at 3400 (amine) and 1740 cm$^{-1}$ (ester carbonyl).

In the following tests the poly(oxyalkylene) aminoesters were blended in gasoline and their deposit control capacity tested in an ASTM/CFR Single-Cylinder Engine Test. In carrying out the tests, a Waukesha CFR single-cylinder engine is used. The run is carried out for 15 hours, at the end of which time the intake valve is removed, washed with hexane and weighed. The previously determined weight of the clean valve is subtracted from the weight of the valve. The differences between the two weights is the weight of the deposit with a lesser amount of deposit measured connoting a superior additive. The operating conditions of the test are as follows: water jacket temperature 100° C. (212° F.); manifold vacuum of 12 in Hg, intake mixture temperature of 50.2° C. (125° F.); air-fuel ratio of 12; ignition spark timing of 40° BTC; engine speed is 1800 rpm; the crankcase oil is a commercial 30W oil. The amount of carbonaceous deposit in milligrams on the intake valves is measured and reported in the following Table I.

The base fuel tested in the above test is a regular octane unleaded gasoline containing no fuel deposit control additive. The base fuel is admixed with 400 ppm of the deposit control additives, poly(oxyalkylene)aminoesters, denoted by letters A–G in the Tables, corresponding to the compounds of the Examples.

TABLE I

| | Intake Valve Deposit Tests | |
|---|---|---|
| | Average Washed Deposit, mg | |
| Compound | 11A Engine | 12A Engine |
| Base Fuel Alone | 150 | 150 |
| A | 23 | 13 |
| C | 66 | 8 |
| D | 26 | 17 |
| E | 100 | 91 |
| G | 112 | 55 |

The above results show the significant reduction in valve deposits achieved by the poly(oxyalkylene) aminoesters compared with base fuel.

In order to demonstrate the capacity of the additives of this invention to function in fuels for internal combustion engines without contributing significantly to engine ORI, "octane requirement increase", the additives were subjected to Thermogravimetric Analysis. Deposit Control Additives showing low TGA values, i.e., more rapid thermal decomposition, have been found to show low ORI values in laboratory engine tests.

In thermogravimetric analysis a small weighed sample of the material to be analyzed is placed in the Analyzer and exposed to a flow of 60 ml of air per minute at the specified temperature and for a specified period. 30 minute exposures at 200° C. and at 290°–300° C. were employed. The results of the test are set forth in Table II following:

TABLE II

| | Thermogravimetric Analysis of Poly(oxyalkylene) Aminoesters | |
|---|---|---|
| Compound | Weight Remaining, % 30 min. at 290°–300° C. | Weight Remaining, % 30 min. at 200° C. |
| A | 1 | 30 |
| B | 2 | 60 |
| C | 1 | 26 |
| Z | 50–60 | 100 |

Compound Z is a commercially available nitrogen-containing deposit control additive which has been found to yield higher ORI values. These data show that the poly(oxyalkylene) aminoesters of this invention have extremely low TGA values which correlates, in these deposit control additives, with low ORI values.

The additives were evaluated in a laboratory dispersancy test. The hexane-insoluble, chloroform-soluble portion of sludge scraped from the crankcase of high mileage engines was added as a chloroform solution to a typical base gasoline containing varying amounts of the test additive. The concentration of additive necessary to prevent coagulation and precipitation of the sludge for at least 30 minutes was measured.

Table III sets forth these results:

TABLE III

| Compound | Conc., ppm |
|---|---|
| A | 300 |
| B | 300 |
| C | 600 |
| D | 200 |
| E | 300 |
| F | 800-1600 |

Since even additives showing some dispersant activity may require concentrations of 3,000 ppm or more in order to achieve the results obtained with Compounds A-F at 200-1600 ppm, the above data indicate that all of these additives are effective dispersants.

Although many specific embodiments of the invention have been described in detail, it should be understood that the invention is to be given the broadest possible interpretation within the terms of the following claims.

What is claimed is:

1. Hydrocarbylpoly(oxyalkylene) aminoesters having a molecular weight from about 600 to about 5,000, suitable for use as deposit control additives and dispersants in hydrocarbonaceous fuels and lubricants, which are monoesters of a monocarboxylic $C_2-C_{20}$ (amino-substituted) alkanoic acid and a hydrocarbylpoly(oxyalkylene) alcohol; wherein said amino-substituent contains about 1-12 amine nitrogen atoms and up to 40 carbon atoms and has a carbon:nitrogen ratio of up to about 10:1; said hydrocarbylpoly(oxyalkylene) moiety has a molecular weight from about 500 to about 5,000 and is composed of at least 5 oxyalkylene units of from 2 to 5 carbon atoms; and said hydrocarbyl group contains from 1 to 30 carbon atoms.

2. The aminoester of claim 1 in which said monocarboxylic alkanoic acid is a $C_2-C_{10}$ alkanoic acid.

3. The aminoester of claim 1 in which said monocarboxylic alkanoic acid is selected from propionic, butyric and pentanoic acids.

4. The aminoester of claim 1 wherein said amino-substituent contains from 2 to 12 nitrogen atoms and from 2 to 24 carbon atoms and is derived from a polyalkylene polyamine wherein the alkylene unit contains from 2 to 6 carbon atoms.

5. The aminoester of claim 4 in which said polyalkylene polyamine contains from 2 to 6 carbon atoms and 2-4 nitrogen atoms.

6. The aminoester of claim 5 in which said polyalkylene polyamine is selected from ethylene diamine, diethylene triamine, triethylene tetraamine, and dimethylamine propylamine.

7. The aminoester of claim 1 in which said hydrocarbyl group is selected from $C_1-C_{30}$ alkyl groups and $C_7-C_{30}$ alkyl phenyl groups.

8. The aminoester of claim 1 wherein said hydrocarbylpoly(oxyalkylene) moiety has a molecular weight of 1000-2500.

9. The aminoester of claim 1 in which said oxyalkylene units are $C_3-C_4$ units.

10. The aminoester of claim 1 which is a butyl-poly(oxybutylene) beta-aminopropionate.

11. The aminoester of claim 1 which is an alkylphenyl poly(oxybutylene) beta-aminopropionate.

12. The aminoester of claim 1 which is a butyl-poly(oxypropylene) beta-aminopropionate.

13. A fuel composition comprising a major amount of hydrocarbons boiling in the gasoline range and 30-2000 ppm of the aminoester of claim 1 in which at least sufficient number of said oxyalkylene units are branched-chain oxyalkylene units to render said ester soluble in said fuel composition.

14. A lubricating composition comprising a major amount of an oil of lubricating viscosity and 0.01-10 weight percent of the aminoester of claim 1 in which at least a sufficient number of said oxyalkylene units are branched-chain oxyalkylene units to render said ester soluble in said lubricating oil composition, and said hydrocarbyl group contains from 1 to 30 carbon atoms.

15. The fuel composition of claim 13 which also contains from 100 to 5000 ppm of a fuel-soluble poly(oxyalkylene) alcohol, glycol or polyol.

16. The fuel composition of claim 15 in which the poly(oxyalkylene) compound is propylpoly(oxypropylene) alcohol.

17. A concentrate comprising an inert stable oleophilic organic solvent boiling in the range for about 150° to 400° F., and from 10 to 25 weight percent of the aminoester of claim 1.

18. A concentrate according to claim 17 which also contains ($C_1-C_{30}$ hydrocarbyl) poly(oxyalkylene) alcohol in the amount of from 5 to 80 weight percent.

* * * * *